(12) United States Patent
Majdabadi et al.

(10) Patent No.: US 11,178,545 B2
(45) Date of Patent: Nov. 16, 2021

(54) ON-DEMAND PERSONAL HOTSPOT

(71) Applicant: INTERNATIONAL BUSINESS MACHINES CORPORATION, Armonk, NY (US)

(72) Inventors: Hamid Majdabadi, Ottawa (CA); Su Liu, Austin, TX (US); Iman Johari, Coquitlam (CA); Tiberiu Suto, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/438,977

(22) Filed: Jun. 12, 2019

(65) Prior Publication Data

US 2020/0396609 A1    Dec. 17, 2020

(51) Int. Cl.
| | |
|---|---|
| *H04W 12/68* | (2021.01) |
| *H04W 12/06* | (2021.01) |
| *H04W 60/00* | (2009.01) |
| *H04W 12/08* | (2021.01) |
| *H04W 76/11* | (2018.01) |

(52) U.S. Cl.
CPC ......... *H04W 12/068* (2021.01); *H04W 12/08* (2013.01); *H04W 60/00* (2013.01); *H04W 76/11* (2018.02)

(58) Field of Classification Search
CPC ...... H04W 76/11; H04W 12/08; H04W 60/00
USPC .......................................................... 726/6
See application file for complete search history.

(56) References Cited

U.S. PATENT DOCUMENTS

| | | | |
|---|---|---|---|
| 8,874,470 B2 | 10/2014 | Karaoguz et al. | |
| 9,078,137 B1* | 7/2015 | Chechani | H04W 84/12 |
| 2008/0244705 A1* | 10/2008 | Cromer | H04L 63/02 |
| | | | 726/3 |

(Continued)

FOREIGN PATENT DOCUMENTS

CN    103052046    4/2013

OTHER PUBLICATIONS

Vanderhulst et al., "Public WiFi hotspots at your service", doi: 10.1109/PerComW.2012.6197522, 2012, pp. 411-414. (Year: 2012).*

(Continued)

*Primary Examiner* — Peter C Shaw
(74) *Attorney, Agent, or Firm* — Schmeiser, Olsen & Watts, LLP; Maeve Carpenter

(57) ABSTRACT

A method, system and computer program product includes receiving registration information by a plurality of offering participants, verifying that the secure wireless internet connections of each of the plurality of offering participants is acceptable, providing an interface to a receiving participant device, the interface configured to allow a receiving participant to view each of the secure wireless internet connections and make a selection, receiving the selection by the receiving participant to join a selected one of the secure wireless internet connections, authenticating connection initialization for the receiving participant to join the selected one of the secure wireless internet connections, and facilitating a secure access connection by the receiving participant to the selected one of the secure wireless internet connections. The computer system is a third party system controlled by a party other than any of the plurality of offering participants and the receiving participant.

17 Claims, 7 Drawing Sheets

(56) References Cited

U.S. PATENT DOCUMENTS

| | | | | |
|---|---|---|---|---|
| 2012/0113971 A1* | 5/2012 | Giaretta | ............... | H04W 48/20 370/338 |
| 2013/0304631 A1* | 11/2013 | Wang | ..................... | H04W 4/24 705/39 |
| 2014/0348152 A1* | 11/2014 | Vanderhulst | ............ | H04W 4/00 370/338 |

OTHER PUBLICATIONS

Lei et al., "Finding Route Hotspots in Large Labeled Networks," in IEEE Transactions on Knowledge and Data Engineering, doi: 10.1109/TKDE.2019.2956924, 2019. (Year: 2019).*

Grinshpun et al., "Intelligent connection manager for seamless interworking of multi-technology mobile devices", Nokia Bell Labs, Mar. 2011, doi: 10.1002/bltj.20469, pp. 5-21. (Year: 2011).*

Zhu et al., "Splendor: A secure, private, and location-aware service discovery protocol supporting mobile services", IEEE, doi: 10.1109/PERCOM.2003.1192746, 2003, pp. 235-242. (Year: 2003).*

Berbecaru et al., "On Measuring SSL-based Secure Data Transfer with Handheld Devices", IEEE, doi: 10.1109/ISWCS.2005.1547731, 2005, pp. 409-413. (Year: 2005).*

Biri et al., "A Novel Protocol for Securing Wireless Internet Service Provider's Hotspots", IEEE, doi: 10.1109/ccnc08.2007.269, 2008, pp. 1206-1207. (Year: 2008).*

Jamaluddin et al., "Hotring advertising model forbroadband hotspots", IEEE, doi: 10.1109/WCNC.2004.1311403, 2004, pp. 2064-2068 vol. 4. (Year: 2004).* ip.com; Extended Wireless, Authors et al: IBM, Original Pub Date: Nov. 4, 2009, IP.com No. IPCOM000189315D, 2 pages.

Mell, Peter et al.; "The NIST Definition of Cloud Computing;" National Institute of Standards and Technology; Special Publication 800-145; Sep. 2011; 7 pages.

* cited by examiner

ON-DEMAND PERSONAL HOTSPOT

TECHNICAL FIELD

The present invention relates to personal hotspots. More specifically, the invention relates to systems and methods for allowing participants to share personal hotspot internet access.

BACKGROUND

Connectivity to the internet has become an essential part of everyday life for many people. Society has become deeply dependent on access to a reliable internet connection. In addition to allowing people to communicate and network, the internet increases productivity and collaboration, and spreads important information that many people have come to depend on. Yet, there are times and places where an individual might not have access to the internet, a hotspot, or Wi-Fi when such access is needed or desired. This may occur, for example, when a person is traveling, or has run out of data in their cellular plan. In such a situation, devices might find existing in-range Wi-Fi hotspots. However, these are likely password protected and not available to the public. Existing solutions to this scenario rely on physical devices that act as portable rental wireless routers that share a Wi-Fi hotspot to one or many devices. However, users must still predict ahead of time that they will need such a physical device so that they have it at the time of need.

SUMMARY

An embodiment of the present invention relates to a method, and associated computer system and computer program product. One or more processors of a computer system receive registration information by a plurality of offering participants, the registration information including a device identifier, a connection identifier, and a password, wherein the device identifier, the connection identifier and the password are each associated with a secure wireless internet connection of each offering participant. The one or more processors of the computer system verify that the secure wireless internet connections of each of the plurality of offering participants is acceptable and provide an interface to a receiving participant device, the interface configured to allow a receiving participant to view each of the secure wireless internet connections and make a selection. The one or more processors of the computer system receive the selection by the receiving participant to join a selected one of the secure wireless internet connections. The one or more processors of the computer system authenticate connection initialization for the receiving participant to join the selected one of the secure wireless internet connections. The one or more processors of the computer system facilitate a secure access connection by the receiving participant to the selected one of the secure wireless internet connections. The computer system is a third party system controlled by a party other than any of the plurality of offering participants and the receiving participant.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention seeks to provide on-demand personal hotspots to participant users through private and secure connection rentals. Via the proposed systems and methods, offering participants are able to share or otherwise provide network connectivity to recipient participants in a secure manner that provides for security and/or anonymity between the participants of the system and facilitates payment between the participants. Aspects of the present invention leverages technology to provide mobile hotspots for the recipient participants using the network devices or hotspots of any offering participant that has a device capable of providing a hotspot or other wireless network connection to proximate recipients participants.

Existing solutions are deficient because they are based on additional physical devices that act as portable wireless routers to share wireless local area networking hotspots to one or many devices. Users of existing solutions are required to know ahead of time that they will need connectivity while they are in a location where they do not have access to connectivity. However, in instances where the user of internet-connected devices do not have such an additional portable wireless router, or was unaware that one would be needed (i.e. when an emergency arises), the user is left without connectivity. The present invention seeks to solve this problem by providing a system and methods where the option of purchasing connectivity becomes far more readily available through the mass sharing of connectivity and thereby the creation of on-demand personal hotspots and private connection rentals.

Figure 1:
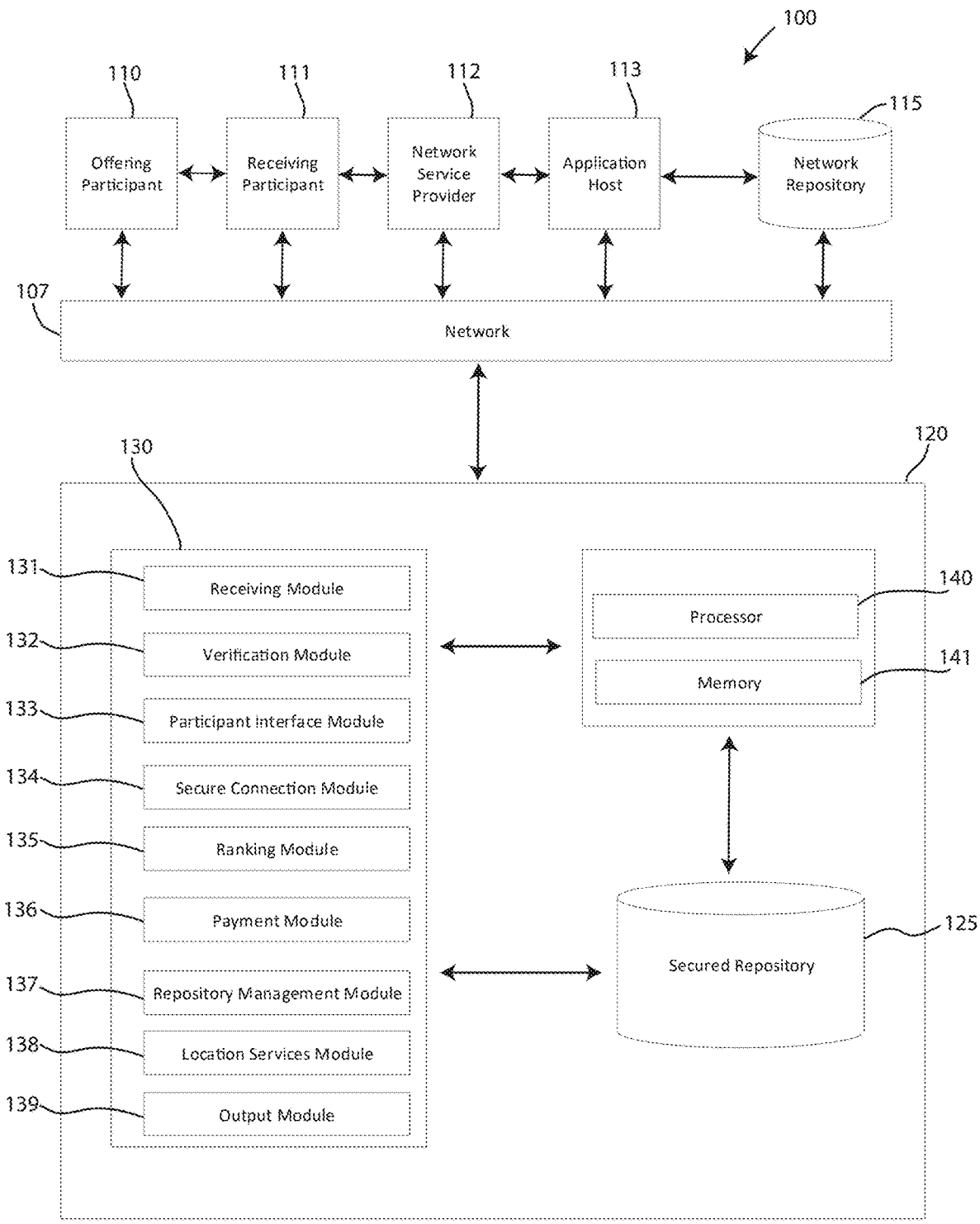
FIG. 1 depicts a block diagram of an on-demand personal hotspot system, in accordance with embodiments of the present invention.

Referring to the drawings, FIG. 1 depicts a block diagram of a on-demand personal hotspot system 100, in accordance with embodiments of the present invention. Embodiments of the on demand personal hotspot system 100 may be configured to receive registration information from offering participants 110 and/or receiving participants 111 and verify the wireless internet connections of offering participants 110. Embodiments of the on-demand personal hotspot system 100 may be configured to provide an interface to receiving participant devices to allow the receiving participants 111 to view the wireless internet connections of the offering participants 110, along with receiving a selection by the receiving participants 111 to join one of the offered secured wireless internet connections. Embodiments of the on-demand personal hotspot system 100 may be configured to authenticate connection initialization for the receiving participant 111 to the selected one of the wireless internet connections of the offering participant 110. Embodiments of the on-demand personal hotspot system 100 facilitate a secure access connection by the receiving participant 111 to the selected secure wireless internet connection. In embodiments of the on-demand personal hotspot system 100, a computer system 120 may provide the various functionality described herein. The computer system 120 may be a third-party system not controlled by any of the offering participants 110 or the receiving participants 111. While the present description herein displays one or more exemplary embodiments of the on-demand personal hotspot system 100 and the computer system 120, various other embodiments incorporating the concepts herein are contemplated. Thus, the invention and the on-demand personal hotspot system 100 is not limited to only provide on-demand personal hotspot connectivity to participant users or recipients and may be configured to provide any combination of the various functionality described herein.

The on-demand personal hotspot system 100 is shown including the offering participant 110, the receiving participant 111, a network service provider 112, an application host 113, and a network repository 115 connected over a network 107 to a computer system 120. The offering participant 110 may be inclusive of each of the participant offering user (and account(s) associated thereof) and one or more devices operated by the offering participant 110. Similarly, the receiving participant 111 may be inclusive of each of the participant receiving user (and account(s) associated thereof) and one or more devices operated by the receiving participant 111.

Each of the offering participant 110, the receiving participant 111, the network service provider 112, the application host 113, and the network repository 115 may each represent a plurality or a single one of the given element 110, 111, 112, 113, 115. Some or all of the offering participant 110, the receiving participant 111, the network service provider 112, the application host 113, and the network repository 115 may be interconnected to others of these devices. While FIG. 1 shows the offering participant 110, the receiving participant 111, the network service provider 112, the application host 113, and the network repository 115 directly connected to adjacent elements 110, 111, 112, 113, 115, any interconnection (e.g. non-adjacent) of elements 110, 111, 112, 113, 115 is contemplated. Further, while each of the elements 110, 111, 112, 113, 115 are shown as separate features of the on-demand personal hotspot system 100, in some embodiments one or more of the elements 110, 111, 112, 113, 115 may be combined or contain overlapping structure and functionality (e.g. the application host 113 may include functionality or features attributed in the present description to the network repository 115).

In the embodiment shown, the offering participant 110 may represent one or more offering participants. Thus, the invention contemplates the on-demand personal hotspot system 100 includes many offering participants represented by the offering participant 110 shown in FIG. 1. The offering participant 110 may include any device or combination of devices capable of providing a mobile hotspot or other wireless local area network and/or user's associated with those device(s). The offering participant 110 may include a mobile device capable of tethering and/or creating a mobile hotspot. The mobile device may be a mobile phone, a tablet, a laptop computer, a vehicle communication system, or the like. The offering participant 110 may also include a local area network router and/or other routing, switching and/or networking devices. For example, the offering participant 110 may be a home or business capable of providing private non-hotspot connections through private wireless local area networks on a residential and/or business premise.

The receiving participant 111 may be any device that is configured to receive connectivity to the internet via a wireless local area network, such as a personal hotspot or private wireless local area network associated with the offering participant 110. The invention contemplates the on-demand personal hotspot system 100 includes many receiving participants represented by the receiving participant 111 in FIG. 1. The receiving participant 111 may be inclusive of a mobile phone, a laptop computer, a tablet, a smartwatch or other wearable device, a media playing device, or any portable device that a receiving participant user may operate that can connect to the internet via a wireless local area network. The receiving participant 111 may or may not be capable of connecting directly to network service providers 112 such as a cellular network. The receiving participant 111 may represent a plurality of different mobile devices and/or various users thereof or multiple devices owned and operated by a single user.

The network service provider 112 may be one or more network service providers, internet service providers, and/or backbone providers, which provides bandwidth or network access to the offering participant 110 (i.e. the devices associated with the offering participants). The network service provider 112 may be a cellular network provider, in the case that the offering participant 110 is a mobile hotspot created by a mobile device. For example, the network service provider 112 may be a small cell densified network and may include a plurality of small cells providing network service. The network service provider 112 may be a metropolitan network located within an urban environment where bandwidth demand is high. The network service provider 112 may include a macro core network that may include one or more mobile switching center servers (MSC's), each connected to one or more various small cells that may be connected to various smaller cell nodes, such as distributed antenna systems (DAS's), DAS head-ends, remote radio heads (RRH), or the like. In other instances, the network service provider 112 may provide bandwidth and internet connectivity via cable, fiber or other ground-transmitted system, to a private network of a home or business.

The application host 113 may be configured to host an application that is operable on the various devices of the system. For example, the application host 113 may be configured to host an application that is operable on devices of the offering participant 110 and/or the receiving participant 111. The application host 113 be configured to allow these devices to download an application providing the functionality described herein. The application host 113 may be a cloud based service configured to provide for operability of one or more of the applications described herein. The application host 113 may be configured to host one or both of the receiving participant application or the offering participant application, in the contemplated embodiment where the on-demand personal hotspot system 100 includes two separate applications. The application hosted by the application host 113 may be a downloadable application that is operable on a user device, such as a device of the offering or receiving participants 110, 111. While some embodiments contemplate the application host 113 as a separate entity from the computer system 120, in other embodiments, the hosting of one or more applications for the various devices of the system may be accomplished by the computer system 120.

The network repository 115 is a data collection area on the network 107 which may back up and save all the data transmitted back and forth between the nodes of the network 107. For example, the network repository 115 may be a data center saving and cataloging data sent between the nodes of the network 107. The network repository 115 uses this data to generate databases related to the information received. In some embodiments, a data collection center housing network repository 115 may include an analytic module capable of analyzing each piece of data being stored by the network repository 115, Further, the computer system 120 and/or the application host 113 may be integrated with, or may be a component of, the data collection center housing the network repository 115. In some alternative embodiments, the network repository 115 may be a local repository that is connected to the computer system 120 and/or the application host 113.

The network 107 is any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to each of the offering participant network 110, the receiving participant 111, the network service provider 112, the application host 113, and the network repository 115 via the network 107. The computer system 120 is shown as a separate computer system from the application host 113 in the embodiment shown. However, in other embodiments, the computer system 120 may also incorporate the application host services attributable to the application host 113 described herein above.

Embodiments of the computer system 120 contemplated herein include a secured repository 125 for storing information related to the on-demand personal hotspot system 100. The secured repository may be a secured high-level storage server configured to store private user information related to the receiving participant 111 and the offering participant 110. The secured repository 125 may include its own control module that audits a minimum required speed threshold of the offering participant 110 prior to an offer being accessible to the receiving participant 111 in addition to storing encrypted passwords related to users and/or associated with the receiving participant 111 and the offering participant 110. Incoming reviews and payment records may be stored and secured in the secured repository 125.

Further, embodiments of the computer system 0 is shown including a transaction server 130. The secured repository 125 may be in communication with a transaction server 130, a back end of the computer system 120, and may receive and store information from the various 110, 111 of the system. The transaction server 130 may be a system configured to perform various operations, functions, or methods, of the on-demand personal hotspot system 100 described herein below. The transaction server 130 may be configured to manage account and payment authentications. The transaction server may include various modules configured to perform various functionalities of the transaction server 130.

Embodiments of the transaction server 130 includes a module stricture that includes a receiving module 131, a verification module 132, a participant interface module 133, a secure connection module 134, a ranking module 135, a payment module 136, a repository management module 137, a location services module 138, and an output module 139. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 include one or more components of hardware and/or software program code for obtaining, retrieving, collecting, or otherwise receiving information from the offering participant 110, the receiving participant 111, the network service provider 112, the application host 113, and the network repository 115. Likewise, the receiving module 131 is configured to send or otherwise transmit information to the offering participant 110, the receiving participant 111, the network service provider 112, the application host 113, and the network repository 115. For example, the receiving module 131 may be configured to receive registration information from the offering participant 110 such as registration information, a device identifier, a connection identifier, a password associated with a secure wireless internee connection, payment account information and the like. The receiving module 131 may be configured to receive registration information from the receiving participant 111, including device identification information, password information, registration information, payment account information, and the like. The receiving module 131 may further be configured to receive location information related to the location of the receiving participant 111 and/or the offering participant 110. The receiving module 131 may further receive subscription information, user agreement information related to using the on-demand personal hotspot system 100, user review information, or the like.

Referring still to FIG. 1, embodiments of the computer system 120 shown further include a verification module 132. Embodiments of the verification module 132 include one or more components of hardware and/or software program code configured for verifying that the secure wireless internet connections of each of the offering participants 110 is acceptable. For example, the verification module 132 may be configured to determine that the network is connected to the internet, has sufficient bandwidth to provide to receiving participants, is secure and not compromised. The verification module 132 may further check the credentials provided by offering participants to ensure the identity of the offering participant user to confirm that the offering participant user desires for their network to be shared at that time. The verification module 132 may be further configured to determine download and upload speed of the network of the offering participant. The verification module 132 may be configured to check contract details between the network service providers 112 or other internet service provider that is providing service to the offering participant 110 before proceeding with publishing an offer. The verification module 132 may also be configured to verify information related to the receiving participant 111, such as confirming log-in information and identity verification and authentication of the receiving participant 111.

Embodiments of the computer system 120 shown further include a participant interface module 133. Embodiments of the participant interface module 133 include one or more components of hardware and/or software program code configured for providing an interface to a device of the receiving participant 111 and/or a device of the offering participant 110. The participant interface module 133 may be an application host module that replaces the application host 113 that is separate from the computer system 120. In other embodiments, the participant interface module 133 and the application host 113 provide user interface applications to the participants 110, 111 in combination.

The interface for a receiving participant 111 provided by the interface module 133 may be an application interface displayed on a screen of a device of the receiving participant 111. The interface may include signup functionality—allowing receiving participants 111 to provide identifying information, payment information, profile information, preference information, and the like to the computer system 120. The interface may be configured to scan for available offering networks and include a map or list screen or interface showing available offering networks from the offering participants 110. The interface may provide for the capabilities of a receiving participant 111 to search for various offers from offering participants 110, including toggling or specifying search parameters related to speed, type of network, location, signal strength, cost, and the like. The interface may be configured to display results in an order using ranking algorithms adopted by the ranking module 135, described herein below. The interface may further be configured to provide detailed information regarding various offers to the receiving participants 111, such as the signal strength, cost, speed of the network, type of network, and the like. The interface may provide the ability for the receiving participant 111 to input and update payment methods and agree to usage terms for using the on-demand personal hotspot system 100. The interface may further be configured to notify a receiving participant 111 when a connectivity session has begun (once an offer has been accepted), and when a connectivity session is ended, either by disconnection by the receiving participant or offering participant. The interface may still further be configured to provide billing information to the receiving participant 111 related to a connectivity session that has been completed, once disconnection occurs. The interface may further be configured to allow a receiving participant 111 to rate, rank or otherwise provide feedback on a given offering participant's network after the connectivity session is ended.

The interface module 133 may be configured to provide an application interface to the offering participant 110, through a device of the offering participant 110. In the event that the offering participant 110 is providing a personal hotspot through a mobile device that is connected to the network service provider 112, the interface may be provided on the mobile device of the offering participant 110. In the event that the offering participant 110 is a business or residence, the application interface may be provided on a computer, or other device or system that is connected to a router or other network device of that business or residence. Whether providing a mobile hotspot with a mobile device, or providing connectivity through other wireless area network equipment, the offering participant 110 may be provided with an interface that allows the offering participant 110 to register their device or network with the computer system 120. The interface may be configured to allow an offering participant 110 to provide device identification information and provide a set name and password for the network being offered to the computer system 120, and specifically the transaction server 130. The interface may be configured to provide the offering participant 110 the ability to control access tune and location of the offer, and to turn an offer on or off at will. The interface may further be configured to allow an offering participant 110 to apply various restrictions an offer, such as a data limit, a time limit or the like. The interface may further be configured to provide an offering participant 110 a notification when a receiving participant 111 is using their network and a connectivity session has begun, and also when the connectivity session has ended. The interface may still further be configured to provide billing information to the offering participant 110 related to payments made by the receiving participant 111 from a connectivity session that has been completed, once disconnection occurs. The interface may further be configured to allow an offering participant 110 to review ratings, rankings or other feedback given by a receiving participant related to the offering participant's network after the connectivity session is ended.

Embodiments of the computer system 120 further includes a secure connection module 134. The secure connection module 134 may include one or more components of hardware and/or software program code configured for analyzing received selections made by a participant 110, 111 of which offer has been accepted, and authenticating a connection initialization based on that received selection for a receiving participant 111 to join a selected wireless internet connection. The secure connection module 134 may further be configured to facilitate a secure access connection by the receiving participant 111 to the selected wireless internet connection. This security may be provided because the computer system 120 and transaction server 130 may be a trusted a third party system that is not controlled by any of the plurality of offering participants 110 or the receiving participants 111 in the system. The secure connection module 134 may ensure that any confidential, payment or personal information provided by the participants 110, 111 in the system is maintained securely and confidentially by the computer system 120 and is only available to the party that provided such information.

Referring still to FIG. 1, the computer system 120 further includes a ranking module 135. Embodiments of the ranking module 135 include one or more components of hardware and/or software program code configured for ranking wireless internet connections of the various offering participants 110 based on signal strength, speed, type of connection (mobile hotspot or private wireless local area network), ratings or reviews, cost or a combination thereof. The ranking module 135 may be configured to provide personalized rankings based on the preferences of a given receiving participant 111.

The computer system 120 further includes a payment module 136. Embodiments of the payment module 136 include one or more components of hardware and/or software program code configured for facilitating payment from an account of a receiving participant 111 to an account of an offering participant 110 after disconnection of a secured connectivity session. The payment module 136 may be configured to offer various payment plans before, after and/or during a connectivity session. For example, the payment module 136 may provide for a payment amount based on the amount of time the connectivity session lasts, or may alternatively provide for a payment amount based on the amount of data used during a connectivity session. Different payment amounts may be provided for various offers based on various factors, such as speed, type of connection, type of network, and the like. The payment module 136 may be a secure payment module that does not provide sensitive, personal, or account information between the various participants 110, 111 of the system. Further the payment module 136 may be configured to interface with an outside payment partner (e.g. an online payment system) so that payment information is not stored in the computer system 120 or the secured repository 125, but rather in the outside payment partner system. Whatever the embodiment, the payment module 136 may be configured to ensure that payment from the receiving participant 111 to the offering participant 110 is secure and can be trusted by the participants 110, 111.

Referring still to FIG. 1, the computer system 120 further includes a repository management module 137. Embodiments of the repository management module 137 include one or more components of hardware and/or software program code configured for updating the secured repository 125 or other repository management service with transaction information related to the secure connection. This transaction information may include location information, time information, usage information, or other historical information related to the secure connection session. This information may be used after the connection session is disconnected in order to facilitate payment calculation by the payment module 136. The repository management module 137 may be a secured module that audits minimum required speed of the offering participants 110 prior to those networks becoming accessible to the receiving participants 111. The repository management module 137 may further be configured to store private user information, and reviews, ratings and payment records related to the participants 110, 111.

The computer system 120 further includes a location services module 138. Embodiments of the location services module 138 include one or more components of hardware and/or software program code configured for determining the location of the various participants of the system, including both the offering participants 110 and the receiving participants 111. The location services module 138 may be configured to store locations in the form of a map that is updated in real time as the participants 110, 111 move. The location services module 138 may be configured to manage accessible offers to receiving participants based on this stored and updated location map.

Referring still to FIG. 1, embodiments of the computer system 120 shown further includes an output module 139. Embodiments of the output module 139 include one or more components of hardware and/or software program code configured for providing outputs to the various devices within the on-demand personal hotspot system 100. For example, the output module 139 may be configured to output information generated by the participant interface module 133, the ranking module 135, the repository management module 137 and stored in the data repository 125. The output module 139 may be configured to provide ranked offers to the receiving participant 111. The output module 139 may be configured to provide connection and disconnection notifications to the various participants 110, 111, along with payment receipts or confirmations.

Referring still to FIG. 1, embodiments of the computer system 120 may be equipped with a memory device 142 which may store information being used by the transaction server 130 of the computer system 120. The computer system 120 may further be equipped with a processor 141 for implementing the tasks associated with the on-demand personal hotspot system 100 and perform processing associated with the functionality of the transaction server 130.

Figure 2:
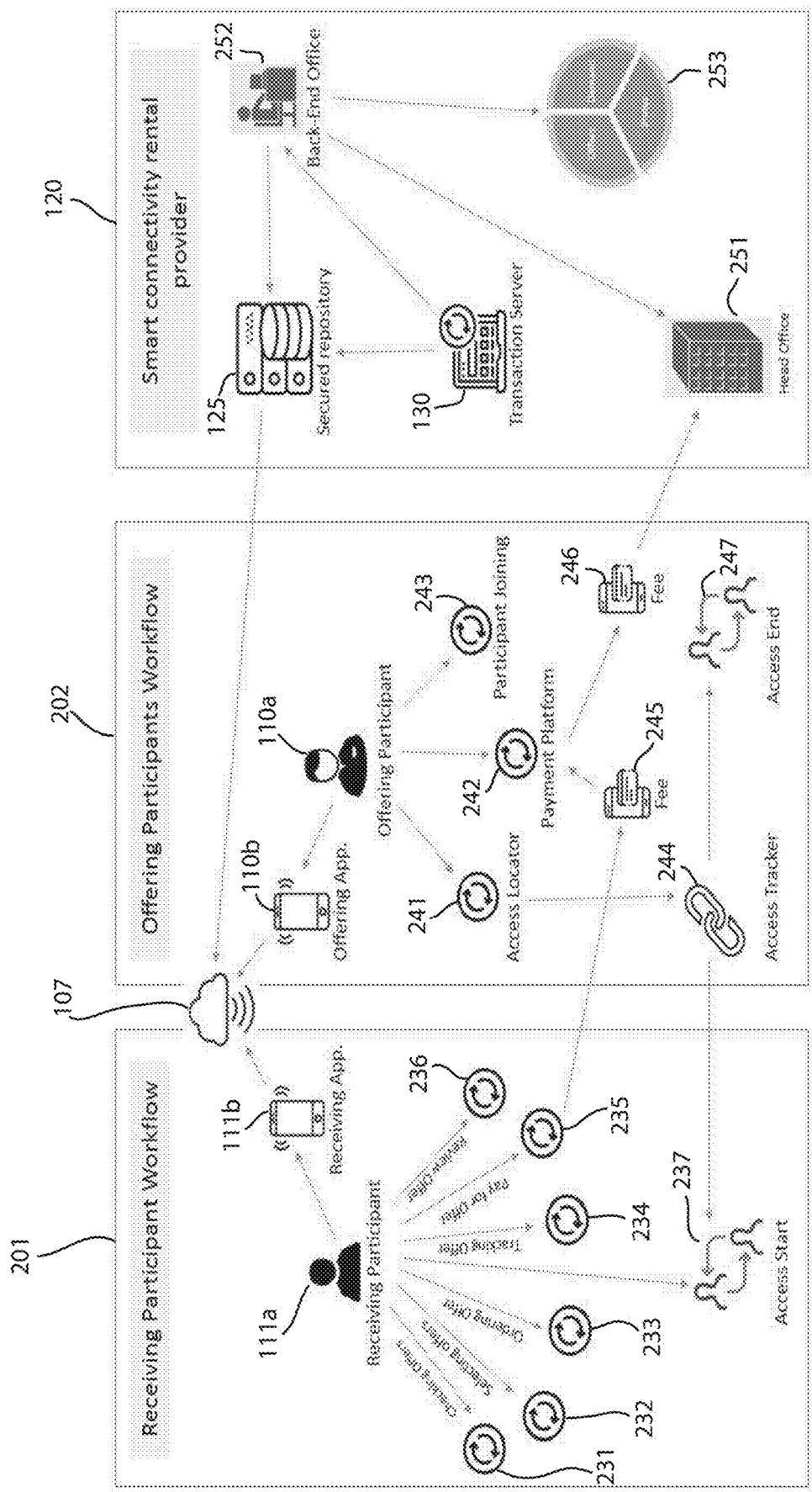
FIG. 2 depicts a schematic view of a system workflow of the on-demand personal hotspot system of FIG. 1, in accordance with embodiments of the present invention.

FIG. 2 depicts a schematic view of a system workflow of the on-demand personal hotspot system 100 of FIG. 1, in accordance with embodiments of the present invention. As shown, a receiving participant workflow 201 includes a receiving participant 111*a* operating a receiving application on a receiving participant device 111*b*. The receiving participant 111*a* via the receiving participant device 111*b* may perform various application workflows utilizing the application of the on-demand personal hotspot system 100 including checking offers 231, selecting offers 232, ordering offers 233, tracking offers 234, paying for offers 235, and reviewing offers 236. These workflows may be facilitated and/or otherwise performed by the transaction server 130. Once the receiving participant 111*a*, 111*b* selects and begins a connectivity session over the network 107, the workflow proceeds to an access start 237 initiates a connectivity session.

The system workflow of the on-demand personal hotspot system 100 further is shown to include an offering participant workflow 202. The offering participant workflow includes an offering participant 110*a* operating an offering an offering participant application on an offering participant device 110*b*. The offering participant 110*a* via the offering participant device 110*b* may perform various application workflows utilizing the application of the on-demand personal hotspot system 100 including an access locator 241 workflow, a payment platform 242, and a participant joining 243 workflow. The payment platform 242 may be configured to accept fees 245, 246 based on payments made by the receiving participant 111*a*. An access tracker 244 may be configured to track access granted to receiving participants 111*a*, 111*b* to secured wireless networks of the offering participants 110*a*, 110*b*. An access end workflow 247 is shown as part of the offering participant workflow 202 although this step may also be included in the receiving participant workflow 201 in the event that the receiving participant 111*a*, 111*b* disconnects and ends a connectivity session access.

The system workflow of the on-demand personal hotspot system 100 further is shown to include a smart connectivity rental provider workflow 202. The smart connectivity rental provider may be the computer system 120, and may include the secured repository 125 and/or the transaction server 130 connected to the network 107 and receiving the various information from the participants 111*a*, 110*a* and their devices 111*b*, 110*b*. The secured repository 125 may be connected to a back end office 252 for database administration which may keep track of the status 253 of various offers, demands and the like. A portion 246 of the payment 245 received from the receiving participant 111*a* to the offering participant 110*a* may further be forwarded to a head office 251 for processing. This portion 246 may represent a service fee for the computer system 120 providing the on-demand personal hotspot system 100.

Figure 3:
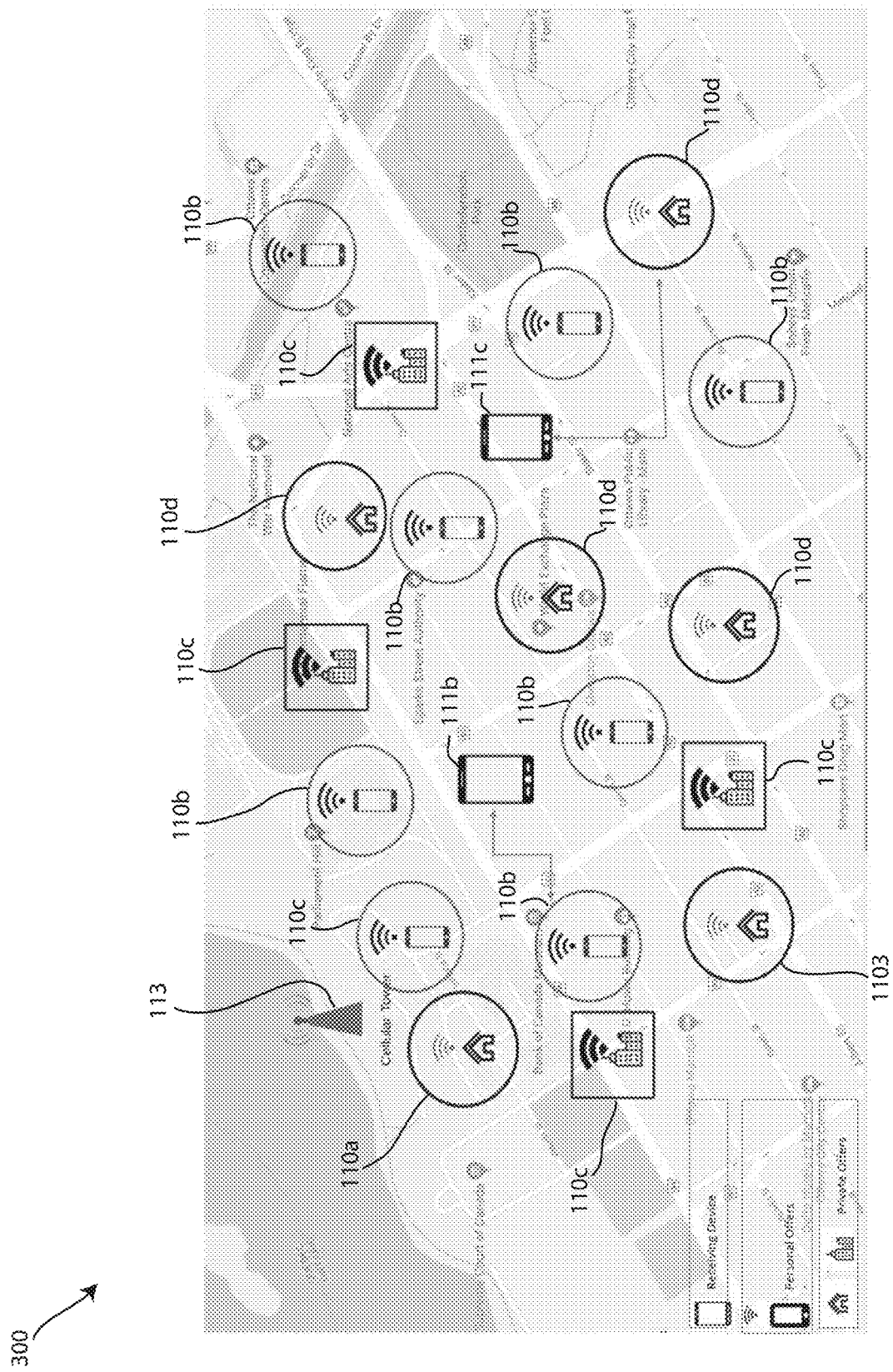
FIG. 3 depicts a network map of the on-demand personal hotspot system of FIGS. 1 and 2, in accordance with embodiments of the present invention.

FIG. 3 depicts a network map 300 of the on-demand personal hotspot system of FIGS. 1 and 2, in accordance with embodiments of the present invention. The network map 300 includes an urban map of various receiving participant devices 111*b*, 111*c* located proximate several offering participant devices 110*b*, 110*c*, 110*d*. As shown, the offering participant devices 110*b*, 110*c*, 110*d* are categorized into three separate kinds of networks—residential private wireless local area networks 110*d*, commercial private wireless local area networks 110*c*, and mobile device hotspots 110*b* of individual offering participants 110. In the embodiment shown, a first receiving participant device 111*b* has selected an offer from one of the mobile device hotspots 110*b* proximate where the first receiving participant device 111*b* is located. Likewise, a second receiving participant device 111*c* has chosen a residential private wireless local area network 110*d* that is proximate where the second receiving participant device 111*c* is located. The network map 300 is an exemplary embodiment of a map that the location services module 138 may maintain and continually update. Some or all of the information on this network map 300 may also be provided to the interfaces provided by the interface module 133 to the various participants 110, 111 in the on-demand personal hotspot system 100.

Figure 4:
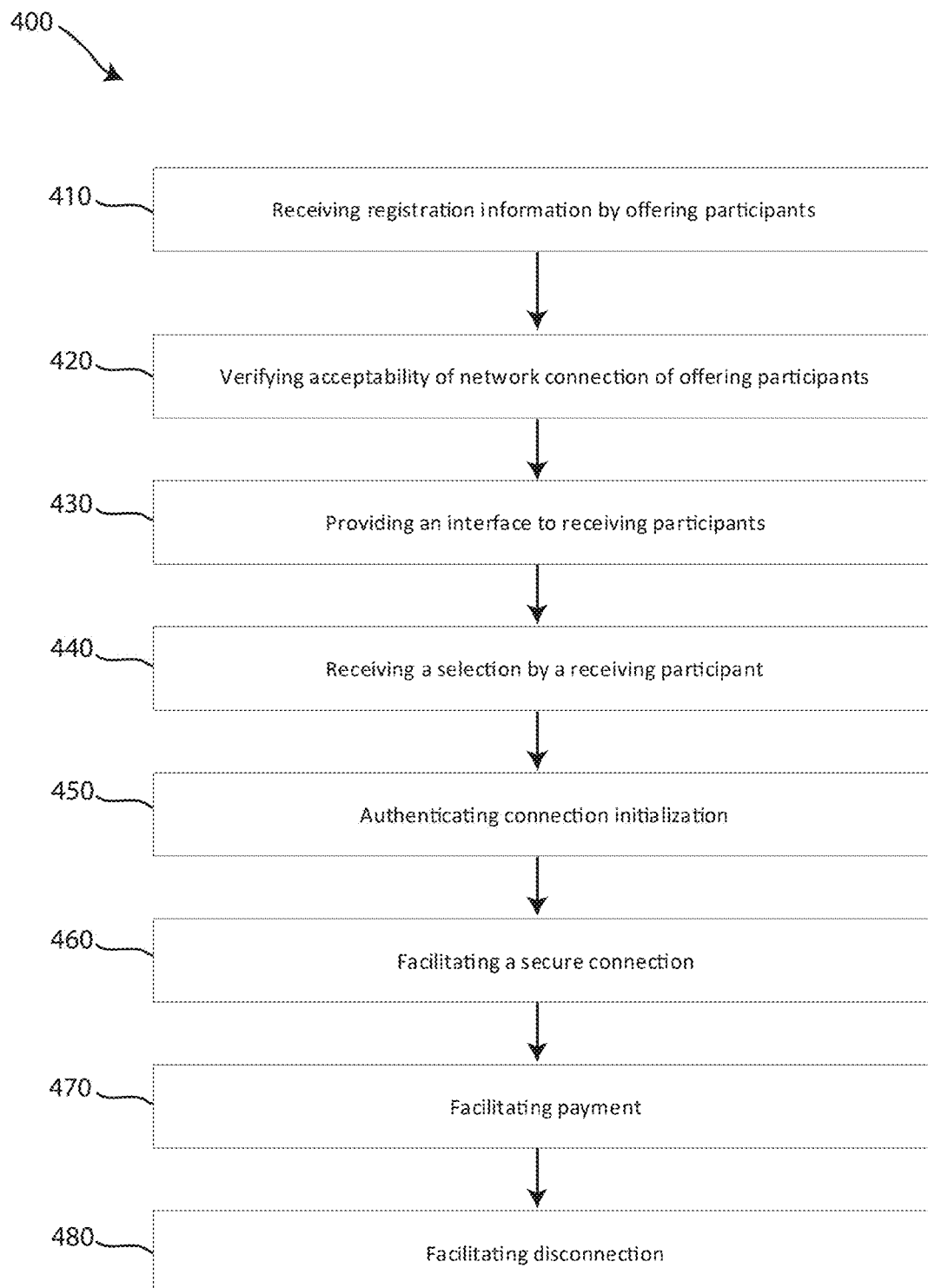
FIG. 4 depicts a flow chart of a method of providing an on-demand personal hotspot, in accordance with embodiments of the present invention.

FIG. 4 depicts a flow chart of a method 400 of providing an on-demand personal hotspot, in accordance with embodiments of the present invention utilizing a computer system, such as the computer system 120, which is a third-party system. The method 400 includes a step 410 of receiving, by one or more processors of a computer system such as the computer system 120, registration information by a plurality of offering participants such as the offering participant 110, the registration information including a device ID, a connection identifier, and a password associated with a secure wireless internet connection of each offering participant. The method 400 may include a step 420 of verifying, by the one or more processors of the computer system, that the secure wireless internet connections of each of the offering participants is acceptable. In embodiments of the method 400, at least one of the secure wireless internet connections is a personal hotspot associated with a mobile device of one participant of the plurality of offering participants.

The method 400 includes a step 430 of providing, by the one or more processors of the computer system, an interface to a receiving participant device such as the receiving participant 111. The interface may be in the form of the application hosted by an application host 113 and/or computer system and may be configured to allow a receiving participant to view each of the secure wireless internet connections and make a selection. The method 400 includes a step 440 of receiving, by the one or more processors of the computer system, the selection by the receiving participant to join a selected one of the secure wireless internet connections. The method includes a step of authenticating, by the one or more processors of the computer system, connection initialization for the receiving participant to join the selected one of the secure wireless internet connections. The method 400 includes a step 460 of facilitating, by the one or more processors of the computer system, a secure access connection by the receiving participant to the selected one of the secure wireless internet connections. The computer system is a third-party system not controlled by any of the plurality of offering participants or the receiving participant.

The method 400 further includes a step 470 of facilitating payment from the receiving participant to the offering participant associated with the selected one of the secure wireless internet connections. The method 400 may further include a step 480 of facilitating disconnecting the receiving participant from the selected one of the secure wireless internet connections. The step 480 may further include providing, by the one or more processors of the computer system, a notification to the receiving participant of the disconnection and updating, by the one or more processors of the computer system, a repository management service, such as the secured repository 125, with transaction information related to the secure access connection, including at least one of location information, time information, and usage information, wherein the facilitating payment includes calculating a payment amount based on the at least one of location information, time information, and usage information.

While not shown, the method 400 may further include one or more steps associated with ranking each of the secure wireless internet connections based at least in part on the signal strength of each of the secure wireless internet connections on the receiving participant device. The ranking may include determining, by the ogre or more processors of the computer system, attributes related to the speed of the secure wireless internet connection being offered by the offering participant. The step 430 of providing the interface to the receiving participant device further includes ranking each of the secure wireless internet connections based at least in part on the speed of the secure wireless internet connection.

Still further, the method 400 may include steps of hosting, by the one or more processors of the computer system or an application host such as the application host 113, at least one application downloadable on a device associated with each of the plurality of offering participants and the receiving participant device. In this embodiment, the method may include the computer system acting as a secure intermediary between the receiving participant and the offering participant of the selected one of the secure wireless internet connections such that credential information related to each of the receiving participant and the offering participant are not exchanged, and such that the offering participant has no access to information related to specific use of the selected one of the secure wireless internet connections by the receiving participant.

Various examples are contemplated for implementing the invention. In one example, a traveler is planning to take a trip to multiple countries in different continents. Because it is difficult to manage data plans in each country and using existing service providers may be costly or not available, the traveler joins the on-demand personal hotspot system 100. While in the traveler's foreign destination using their recipient device, the traveler can initiate the application, hosted by the application host 113 and/or the computer system 120 to view existing hotspot sharing rentals from offering participant 110. The traveler can select one of the offering participant 110 and connect to the internet temporarily as long as the traveler needs. Meanwhile the offering participant user receives some additional income from the transaction, facilitated by the computer system 120.

In another example, plan providers may have limited or no service in locations of a city or rural community. Subscribed users to such plans may not be able to access a cellular network with cellular mobile devices once they are in these "dead zones" outside their coverage map. In this example, the user in a dead zone may utilize the computer system 120 to connect to an offering participant 110 thereby providing the user with an on-demand personal hotspot.

In still another example, people traveling in a moving vehicle such as a plane, train, bus or other moving means may not be connected to their service provider's data plan with their mobile device. In this example, a receiving participant 111 may scan the entire moving vehicle to find and join a hotspot being shared by another person that is traveling on the moving vehicle that has connectivity with their data plan on their device. In this example, the person with connectivity may create the own offering participant 110 via the computer system 120 and associated application, to offer a secure on-demand personal hotspot to the user that needs, but would not otherwise have, internet service.

In still another embodiment, a user is in a crowded commercial building. In this example, in this example, the commercial wireless local area network may be an offering participant 110 that subscribes to the services of the computer system 120 and associated application. Thus, the user may select the commercial wireless local area network as one offering option. However, other offering options may exist for the receiving participant, such as offers originating from one or more users with mobile devices in the crowded commercial building. The various options offered to the receiving participant may be ranked by the computer system 120 by speed, cost, signal strength or any other measurable quality. The receiving user may select the personal hotspot from the offering participant networks that the receiving user desires.

Figure 5:
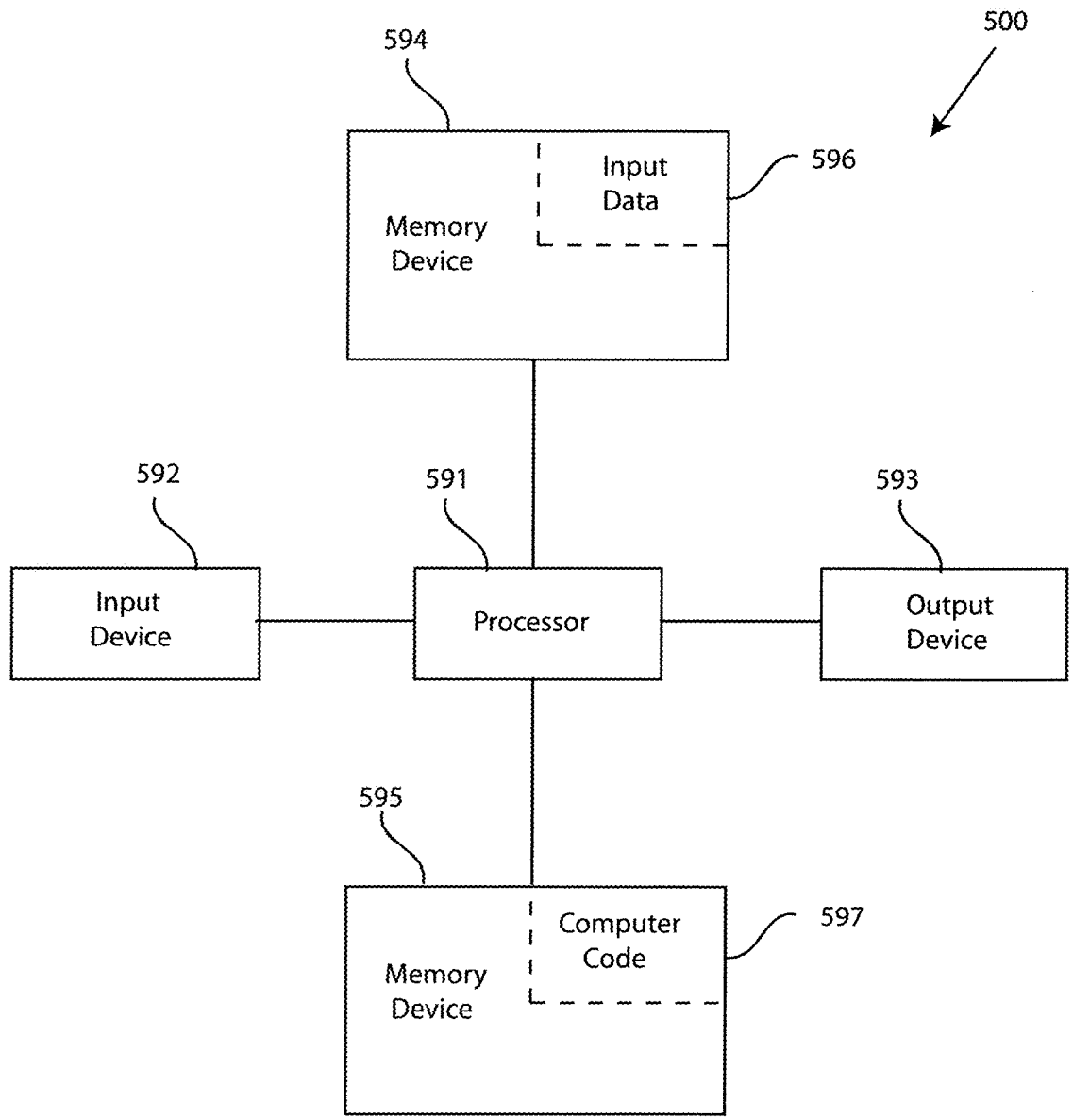
FIG. 5 depicts a block diagram of a computer system of the on-demand personal hotspot system of FIG. 1, capable of implementing methods for providing an on-demand personal hotspot in FIG. 4, in accordance with embodiments of the present invention.

FIG. 5 illustrates a block diagram of a computer system that may representative of any computer or computer system within the on-demand personal hotspot system 100 of FIGS. 1 and 2, capable of implementing methods of providing an on-demand personal hotspot of FIG. 4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method of providing an on-demand personal hotspot, in the manner prescribed by the embodiments of FIG. 4 using the on-demand personal hotspot system 100 of FIG. 1, wherein the instructions of the computer code 597 may be executed by processor 591 via memory device 595. The computer code 597 may include software or program instructions that may implement one or more algorithms for implementing the methods of providing an on-demand personal hotspot, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computes usable storage medium (or said program storage device).

Memory devices 594, 595 include any known computer readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system. 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive a CD-ROM drive which receives a CD-ROM disk). In other embodiments, the data storage unit may include a knowledge base or data repository 5 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods of providing an on-demand personal hotspot. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system to provide an on-demand personal hotspot system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of providing an on-demand personal hotspot. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method of providing an on-demand personal hotspot.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
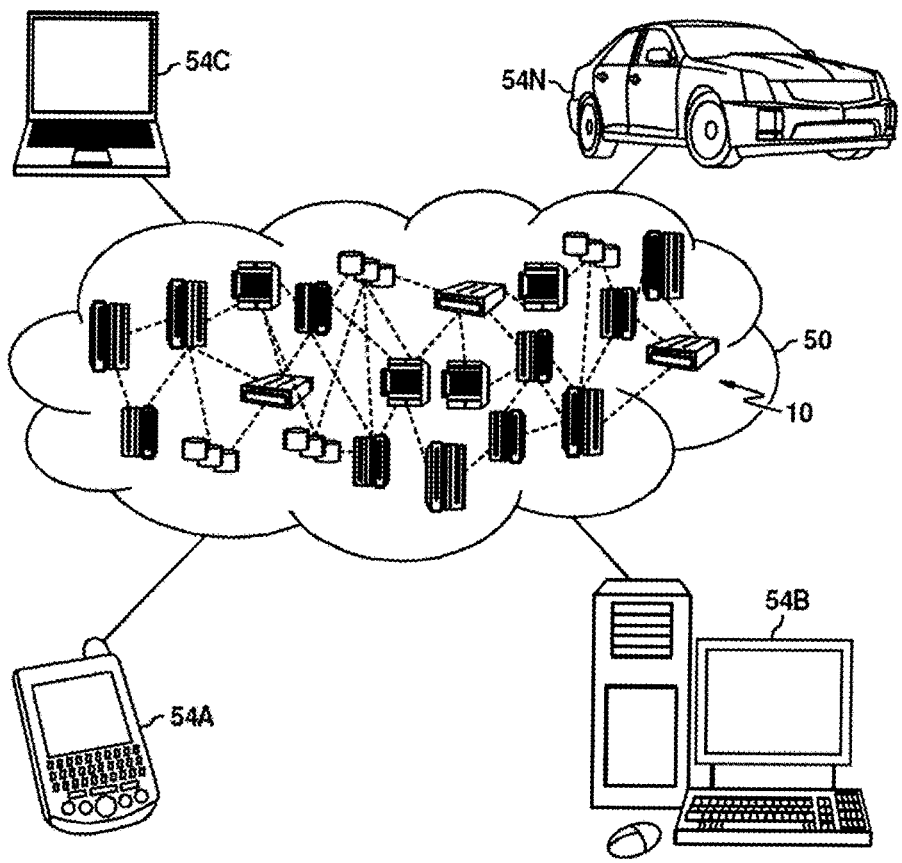
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
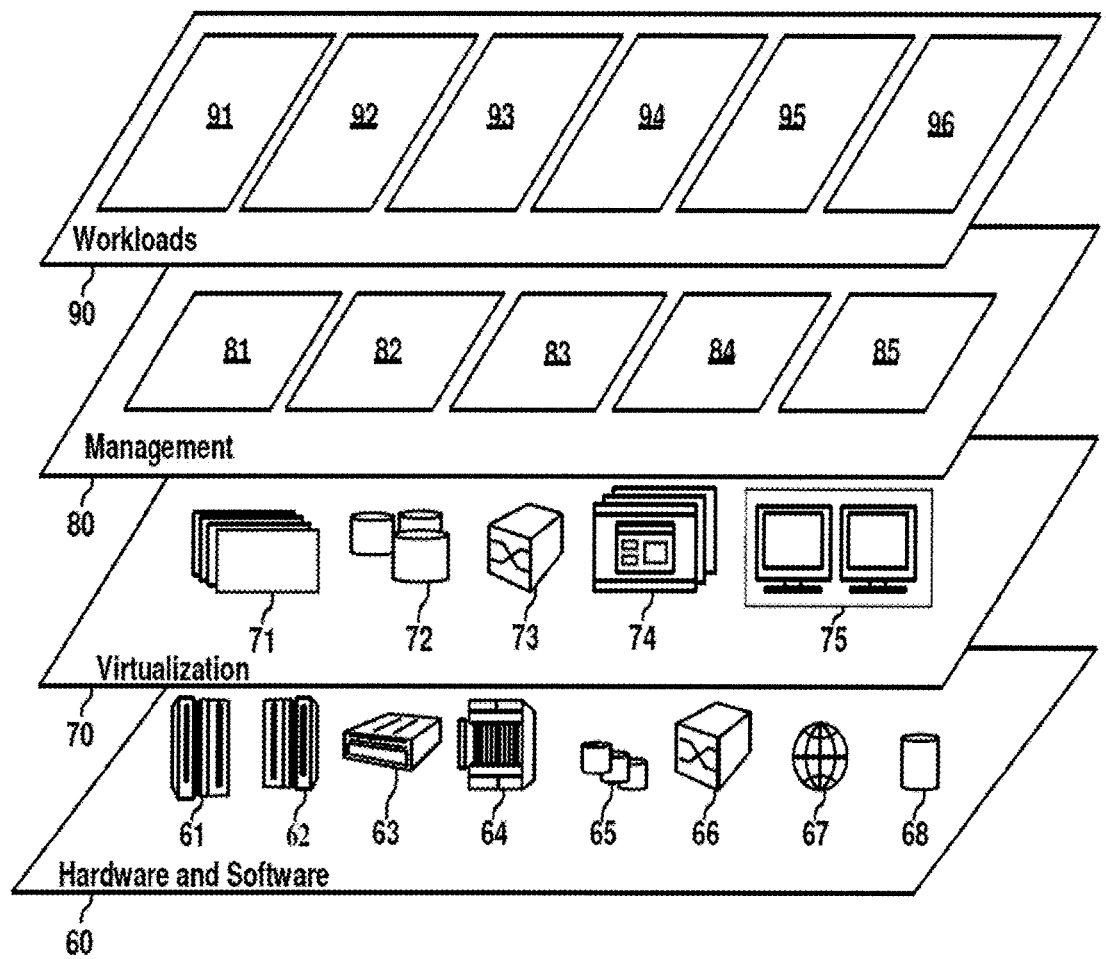
FIG. 7 depicts abstraction model avers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to providing an on-demand personal hotspot 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by one or more processors of a computer system, registration information by a plurality of offering participants, the registration information including a device identifier, a connection identifier, and a password, wherein the device identifier, the connection identifier and the password are each associated with a secure wireless internet connection of each offering participant;
   verifying, by the one or more processors of the computer system, that the secure wireless internet connections of each of the plurality of offering participants are acceptable;
   providing, by the one or more processors of the computer system, an interface to a receiving participant device, the interface configured to allow a receiving participant to view each of the secure wireless internet connections and make a selection;
   receiving, by the one or more processors of the computer system, the selection by the receiving participant to join a selected one of the secure wireless internet connections;
   authenticating, by the one or more processors of the computer system, connection initialization for the receiving participant to join the selected one of the secure wireless internet connections;
   facilitating, by the one or more processors of the computer system, a secure access connection by the receiving participant to the selected one of the secure wireless internet connections; and
   hosting, by the one or more processors of the computer system, at least one application downloadable on a device associated with each of the plurality of offering participants and the receiving participant device,
   wherein the computer system is a third party system controlled by a party other than any of the plurality of offering participants and the receiving participant and wherein the computer system acts as a secure intermediary between the receiving participant and the offering participant of the selected one of the secure wireless internet connections such that credential information related to each of the receiving participant and the offering participant are not exchanged, and
   wherein the computer system acts as the secure intermediary between the receiving participant and the offering participant of the selected one of the secure wireless internet connections such that the offering participant has no access to information related to specific use of the selected one of the secure wireless internet connections by the receiving participant.

2. The method of claim 1, wherein the providing the interface to the receiving participant device further includes ranking each of the secure wireless internet connections based at least in part on the signal strength of each of the secure wireless internet connections on the receiving participant device.

3. The method of claim 2, further comprising:
determining, by the one or more processors of the computer system, attributes related to the speed of the secure wireless internet connection being offered by the offering participant,
wherein the providing the interface to the receiving participant device further includes ranking each of the secure wireless internet connections based at least in part on the speed of the secure wireless internet connection.

4. The method of claim 1, wherein at least one of the secure wireless internet connections is a personal hotspot associated with a mobile device of one of the plurality of offering participants.

5. The method of claim 1, further comprising;
facilitating, by the one or more processors of the computer system, payment from the receiving participant to the offering participant associated with the selected one of the secure wireless internet connections.

6. The method of claim 5, further comprising:
disconnecting, by the one or more processors of the computer system, the receiving participant from the selected one of the secure wireless internet connections;
providing, by the one or more processors of the computer system, a notification to the receiving participant of the disconnection; and
updating, by the one or more processors of the computer system, a repository management service with transaction information related to the secure access connection, including at least one of location information, time information, and usage information, wherein the facilitating payment includes calculating a payment amount based on the at least one of location information, time information, and usage information.

7. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method, the method comprising:
receiving, by the one or more processors of the computer system, registration information by a plurality of offering participants, the registration information including a device identifier, a connection identifier, and a password, wherein the device identifier, the connection identifier and the password are each associated with a secure wireless internet connection of each offering participant;
verifying, by the one or more processors of the computer system, that the secure wireless internet connections of each of the plurality of offering participants is acceptable;
providing, by the one or more processors of the computer system, an interface to a receiving participant device, the interface configured to allow a receiving participant to view each of the secure wireless internet connections and make a selection;
receiving, by the one or more processors of the computer system, the selection by the receiving participant to join a selected one of the secure wireless internet connections;
authenticating, by the one or more processors of the computer system, connection initialization for the receiving participant to join the selected one of the secure wireless internet connections;
facilitating, by the one or more processors of the computer system, a secure access connection by the receiving participant to the selected one of the secure wireless internet connections; and
hosting, by the one or more processors of the computer system, at least one application downloadable on a device associated with each of the plurality of offering participants and the receiving participant device,
wherein the computer system is a third party system not controlled by a party other than by any of the plurality of offering participants or and the receiving participant and wherein the computer system acts as a secure intermediary between the receiving participant and the offering participant of the selected one of the secure wireless internet connections such that credential information related to each of the receiving participant and the offering participant are not exchanged, and
wherein the computer system acts as the secure intermediary between the receiving participant and the offering participant of the selected one of the secure wireless internet connections such that the offering participant has no access to information related to specific use of the selected one of the secure wireless internet connections by the receiving participant.

8. The computer system of claim 7, wherein the providing the interface to the receiving participant device further includes ranking each of the secure wireless internet connections based at least in part on the signal strength of each of the secure wireless internet connections on the receiving participant device.

9. The computer system of claim 8, the method further comprising:
determining, by the one or more processors of the computer system, attributes related to the speed of the secure wireless internet connection being offered by the offering participant,
wherein the providing the interface to the receiving participant device further includes ranking each of the secure wireless internet connections based at least in part on the speed of the secure wireless internet connection.

10. The computer system of claim 7, wherein at least one of the secure wireless internet connections is a personal hotspot associated with a mobile device of one of the plurality of offering participants.

11. The computer system of claim 7, the method further comprising:
facilitating, by the one or more processors of the computer system, payment from the receiving participant to the offering participant associated with the selected one of the secure wireless internet connections.

12. The computer system of claim 11, wherein the analyzing further includes at least one of:
disconnecting, by the one or more processors of the computer system, the receiving participant from the selected one of the secure wireless internet connections;
providing, by the one or more processors of the computer system, a notification to the receiving participant of the disconnection; and
updating, by the one or more processors of the computer system, a repository management service with transaction information related to the secure access connection, including at least one of location information, time information, and usage information, wherein the facilitating payment includes calculating a payment amount based on the at least one of location information, time information, and usage information.

13. A computer program product, comprising a computer readable hardware storage device storing a computer readable program code, the computer readable program code comprising an algorithm that when executed by one or more processors of a computer system implements a method, the method comprising:

receiving, by the one or more processors of the computer system, registration information by a plurality of offering participants, the registration information including a device identifier, a connection identifier, and a password, wherein the device identifier, the connection identifier and the password are each associated with a secure wireless internet connection of each offering participant;

verifying, by the one or more processors of the computer system, that the secure wireless internet connections of each of the plurality of offering participants is acceptable;

providing, by the one or more processors of the computer system, an interface to a receiving participant device, the interface configured to allow a receiving participant to view each of the secure wireless internet connections and make a selection;

receiving, by the one or more processors of the computer system, the selection by the receiving participant to join a selected one of the secure wireless internet connections;

authenticating, by the one or more processors of the computer system, connection initialization for the receiving participant to join the selected one of the secure wireless internet connections;

facilitating, by the one or more processors of the computer system, a secure access connection by the receiving participant to the selected one of the secure wireless internet connections; and hosting, by the one or more processors of the computer system, at least one application downloadable on a device associated with each of the plurality of offering participants and the receiving participant device, wherein the computer system is a third party system controlled by a party other than any of the plurality of offering participants and the receiving participant and wherein the computer system acts as a secure intermediary between the receiving participant and the offering participant of the selected one of the secure wireless internet connections such that credential information related to each of the receiving participant and the offering participant are not exchanged, and wherein the computer system acts as the secure intermediary between the receiving participant and the offering participant of the selected one of the secure wireless internet connections such that the offering participant has no access to information related to specific use of the selected one of the secure wireless internet connections by the receiving participant.

14. The computer program product of claim 13, wherein the providing the interface to the receiving participant device further includes ranking each of the secure wireless internet connections based at least in part on the signal strength of each of the secure wireless internet connections on the receiving participant device.

15. The computer program product of claim 14, the method further comprising:

determining, by the one or more processors of the computer system, attributes related to the speed of the secure wireless internet connection being offered by the offering participant, wherein the providing the interface to the receiving participant device further includes ranking each of the secure wireless internet connections based at least in part on the speed of the secure wireless internet connection.

16. The computer program product of claim 13, the method further comprising:

facilitating, by the one or more processors of the computer system, payment from the receiving participant to the offering participant associated with the selected one of the secure wireless internet connections.

17. The computer program product of claim 16, wherein the analyzing further includes at least one of:

disconnecting, by the one or more processors of the computer system, the receiving participant from the selected one of the secure wireless internet connections;

providing, by the one or more processors of the computer system, a notification to the receiving participant of the disconnection; and updating, by the one or more processors of the computer system, a repository management service with transaction information related to the secure access connection, including at least one of location information, time information, and usage information, wherein the facilitating payment includes calculating a payment amount based on the at least one of location information, time information, and usage information.

* * * * *